(12) United States Patent
Han et al.

(10) Patent No.: US 12,296,838 B2
(45) Date of Patent: May 13, 2025

(54) DEVICE FOR AUTONOMOUS DRIVING AND METHOD THEREOF

(71) Applicants: Hyundai Motor Company, Seoul (KR); Kia Corporation, Seoul (KR); HYUNDAI AUTOEVER Corp., Seoul (KR)

(72) Inventors: Jang Soon Han, Seoul (KR); Kyung Taek Kim, Anyang-si (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 201 days.

(21) Appl. No.: 18/076,974

(22) Filed: Dec. 7, 2022

(65) Prior Publication Data

US 2024/0051559 A1 Feb. 15, 2024

(30) Foreign Application Priority Data

Aug. 10, 2022 (KR) .......................... 10-2022-0100082

(51) Int. Cl.
*B60W 50/08* (2020.01)
*B60W 60/00* (2020.01)
*G06F 16/903* (2019.01)

(52) U.S. Cl.
CPC ...... *B60W 50/085* (2013.01); *B60W 60/0015* (2020.02); *G06F 16/90335* (2019.01); *B60W 2540/045* (2020.02)

(58) Field of Classification Search
CPC .............. B60W 50/08; B60W 50/085; B60W 60/0015; B60W 2540/045; G06F 16/215; G06F 16/2228; G06F 16/243; G06F 16/24522; G06F 16/25; G06F 16/90335; G07C 5/0808; G07C 5/085
(Continued)

(56) References Cited

U.S. PATENT DOCUMENTS

2016/0221816 A1\* 8/2016 Pollock .................. B67D 7/348
2017/0270323 A1\* 9/2017 Butler ............... G06K 19/07749
(Continued)

FOREIGN PATENT DOCUMENTS

DE  102023100597 A1 \* 2/2024 ............ B60W 10/20
JP  6861789 B1  4/2021
(Continued)

OTHER PUBLICATIONS

Feng, et al., "Autonomous Vehicles' Forensics in Smart Cities," 2019 IEEE SmartWorld (https://ieeexplore.ieee.org/document/9060127) (Year: 2019).*

(Continued)

*Primary Examiner* — Atul Trivedi
(74) *Attorney, Agent, or Firm* — Banner & Witcoff, Ltd.

(57) ABSTRACT

Disclosed are a device for managing autonomous driving data and a method thereof. The device includes a controller that receives a key and a query string from an autonomous driving controller of a vehicle, determines an authority level corresponding to the key, modifies the query string based on the authority level, and executes the modified query string, and a database that stores the autonomous driving data according to an execution of the query string.

20 Claims, 6 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2018/0365912 | A1* | 12/2018 | Nyalamadugu .... G06K 7/10366 |
| 2019/0279447 | A1* | 9/2019 | Ricci ..................... B60R 25/01 |
| 2020/0286035 | A1* | 9/2020 | Berger .................. G06Q 10/08 |
| 2020/0353894 | A1* | 11/2020 | Obaidi ................... G05D 1/021 |
| 2021/0056784 | A1 | 2/2021 | Nozawa et al. |
| 2021/0072921 | A1 | 3/2021 | Bielby et al. |
| 2022/0066456 | A1* | 3/2022 | Ebrahimi Afrouzi ....................... G06F 3/04883 |
| 2022/0126864 | A1* | 4/2022 | Moustafa ........... B60W 60/0011 |
| 2022/0172606 | A1* | 6/2022 | Pandya ................. G08G 1/052 |
| 2022/0216991 | A1* | 7/2022 | Cain, Jr. ............... H04L 9/3247 |
| 2022/0216995 | A1* | 7/2022 | Cain, Jr. ................ B60R 25/24 |
| 2022/0327871 | A1* | 10/2022 | Pirwani ................. G06Q 10/08 |
| 2023/0222853 | A1* | 7/2023 | Rich ..................... G07C 5/008 701/29.6 |
| 2023/0222854 | A1* | 7/2023 | Rich .................... G07C 5/0825 701/29.6 |

FOREIGN PATENT DOCUMENTS

| | | | | |
|---|---|---|---|---|
| JP | 6898186 | B2 | 7/2021 | |
| JP | 2021174413 | A | 11/2021 | |
| KR | 10-2227649 | B1 | 3/2021 | |
| KR | 10-2021-0062530 | A | 5/2021 | |
| KR | 10-2021-0063244 | A | 6/2021 | |
| WO | WO-2020205597 | A1 * | 10/2020 | .......... B60W 30/182 |
| WO | WO-2024032438 | A1 * | 2/2024 | |

OTHER PUBLICATIONS

Alhabib, et al., Data Authorisation and Validation in Autonomous Vehicles: A Critical Review (https://doi.org/10.48550/arXiv.2405.17435) (Year: 2024).*

* cited by examiner

DEVICE FOR AUTONOMOUS DRIVING AND METHOD THEREOF

CROSS-REFERENCE TO RELATED APPLICATION

This application claims the benefit of priority to Korean Patent Application No. 10-2022-0100082, filed in the Korean Intellectual Property Office on Aug. 10, 2022, the entire contents of which are incorporated herein by reference.

BACKGROUND

An autonomous vehicle may follow a specified path or reach a set destination by allowing an autonomous driving controller to recognize and determine the current state and surrounding environment of the vehicle without a control input from the driver.

Such an autonomous vehicle may be a vehicle equipped with a specific level of autonomous driving technology. In order to check the performance and safety of an autonomous driving vehicle, a standard for evaluating the level of an autonomous driving system installed in the vehicle according to a certain criterion may be required, and in this case, what is needed is a level of autonomous driving technology.

The matters described in this background section are intended to promote an understanding of the background of the disclosure and may include matters that are not already known to those of ordinary skill in the art.

SUMMARY

The following summary presents a simplified summary of certain features. The summary is not an extensive overview and is not intended to identify key or critical elements.

Some autonomous driving technologies installed in vehicles currently being mass-produced are level 2. Some prototypes of autonomous driving technology for level 3 or higher have been developed, but it has not yet reached the mass production stage officially. In addition, because an autonomous vehicle of level 5 has an unlimited operational design area, it might be impossible to realize it in a short period of time. Therefore, the main targets for technology development and securing safety in the current situation are level 3 and level 4. In particular, the key to level 3 is to secure safety when switching control rights, and in level 4, the system is entirely responsible for the operation design area, so safety must be secured first.

A brief description of the newly enacted level 3 autonomous vehicle safety standards is as follows. First, when using the lane keeping function, the maximum speed and the minimum safe distance from the vehicle in front are suggested according to the detection performance to ensure driving safety. In addition, a standard for switching control by situation in case of an abnormal situation and standards for responding with maximum deceleration and emergency steering according to an emergency operation standard in case of an emergency situation are presented.

In particular, in relation to control switching, when there is no response from the driver within 10 seconds after the driving switching is requested, the risk minimization operation should start automatically from thereafter. In addition, the warning of the driving changeover request must be used by selecting one of visual and auditory, visual and tactile, visual and auditory, and tactile. In addition, the warning intensity should start increasing within 4 seconds after the driving switching is requested. When the driver operates the driving operation or the risk minimization operation starts, the request for switching driving must be stopped.

Meanwhile, a data storage system for automated driving (DSSAD) is a device that records whether the autonomous driving system has operated, which is the criterion for determining the cause of an accident and the responsibility for the accident for prompt victim protection and relief when the autonomous vehicle accident occurs. The DSSAD, which is a system used to determine who the operating subject is, whether there is a problem, and the like to determine who is responsible, stores items and contents related to the responsibility of the accident, such as operation and release of autonomous driving system, driving change request, driver's operation input, start and end of emergency operation, imminent collision risk detection, timing of recording operation information, collision recognition, start of risk minimization operation, serious failure of the system, and the like.

When the DSSAD stores data in a non-volatile memory, a data storage address corresponding to the type of data may be matched in advance, and the data may be stored in the data storage address matched in advance.

Accordingly, when data is damaged due to a partial hardware error in a nonvolatile memory, data cannot be recovered or estimated, and in particular, data desired by a user cannot be freely retrieved from among a large amount of data.

The present disclosure has been made to solve the above-mentioned problems occurring in the prior art while advantages achieved by the prior art are maintained intact.

A device may comprise: a controller configured to: receive, from an autonomous driving controller of a vehicle, a key and a query string; determine at least one tag associated with the query string; determine an authority level corresponding to the key; modify, based on the authority level and the at least one tag, the query string; and execute the modified query string; and a database configured to store autonomous driving data according to an execution of the modified query string.

The autonomous driving controller may comprise a plurality of logics, and may be configured to store the key, and wherein the key may comprise: a first key for a first logic of the plurality of logics; and a second key for a second logic of the plurality of logics.

The controller may be configured to add information indicating an owner and time to the query string received from the autonomous driving controller.

The controller may be configured to determine the authority level corresponding to the key based on a table in which a plurality of authority levels each corresponding to a different key is recorded.

The controller may be configured to modify the query string by deleting, from the query string received from the autonomous driving controller, content unauthorized for the authority level corresponding to the key.

The controller may be configured to: receive, from a diagnostic device, a second key and a second query string; determine a second authority level corresponding to the second key; modify, based on the second authority level, the second query string; and based on the modified second query string, search for the autonomous driving data stored in the database.

The controller may be configured to determine the second authority level based on a table in which a plurality of authority levels each corresponding to a different key is recorded.

The controller may be configured to modify the second query string by deleting, from the second query string received from the diagnostic device, content unauthorized for the second authority level.

The controller may be configured to search for the autonomous driving data stored in the database based on tag information included in the modified second query string.

A method may comprise: receiving, by a controller from an autonomous driving controller of a vehicle, a key and a query string; determining, by the controller, at least one tag associated with the query string; determining, by the controller, an authority level corresponding to the key; based on the authority level and the at least one tag, modifying, by the controller, the query string; executing, by the controller, the modified query string; and storing, in a database, autonomous driving data according to the executing of the modified query string.

The method may further comprise: storing, in the autonomous driving controller, a plurality of logics; and storing, for a first logic of the plurality of logics, the key, wherein the key received from the autonomous driving controller corresponds to the first logic, wherein the receiving the key and the query string comprises receiving the key and the query string from the first logic of the plurality of logics.

The method may further comprise: adding, by the controller, information indicating an owner and time to the received query string.

The method may further comprise: determining, by the controller, a table in which a plurality of authority levels each corresponding to a different key is recorded, wherein the determining the authority level corresponding to the key comprises determining, by the controller, the authority level corresponding to the key based on the table.

The modifying the query string may comprise: deleting, by the controller, content unauthorized for the authority level corresponding to the key from the received query string.

A method may comprise: storing, in a database, autonomous driving data; receiving, by a controller from a diagnostic device, a key and a query string; determining, by the controller, an authority level corresponding to the key; modifying, by the controller and based on the authority level, the query string; and searching, by the controller and based on the modified query string, for the autonomous driving data stored in the database.

The method may further comprise: determining, by the controller, a table in which a plurality of authority levels each corresponding to a different key is recorded, wherein the determining the authority level corresponding to the key comprises determining, by the controller, the authority level corresponding to the key based on the table.

The modifying the query string may comprise: deleting, by the controller, content unauthorized for the authority level corresponding to the key from the received query string.

The searching for the autonomous driving data stored in the database may comprise: searching, by the controller, for the autonomous driving data stored in the database based on tag information associated with the received query string.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing the examples of the present disclosure, a detailed description of the related known configuration or function will be omitted when it is determined that it interferes with the understanding of the features of the present disclosure.

In describing various components described in the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
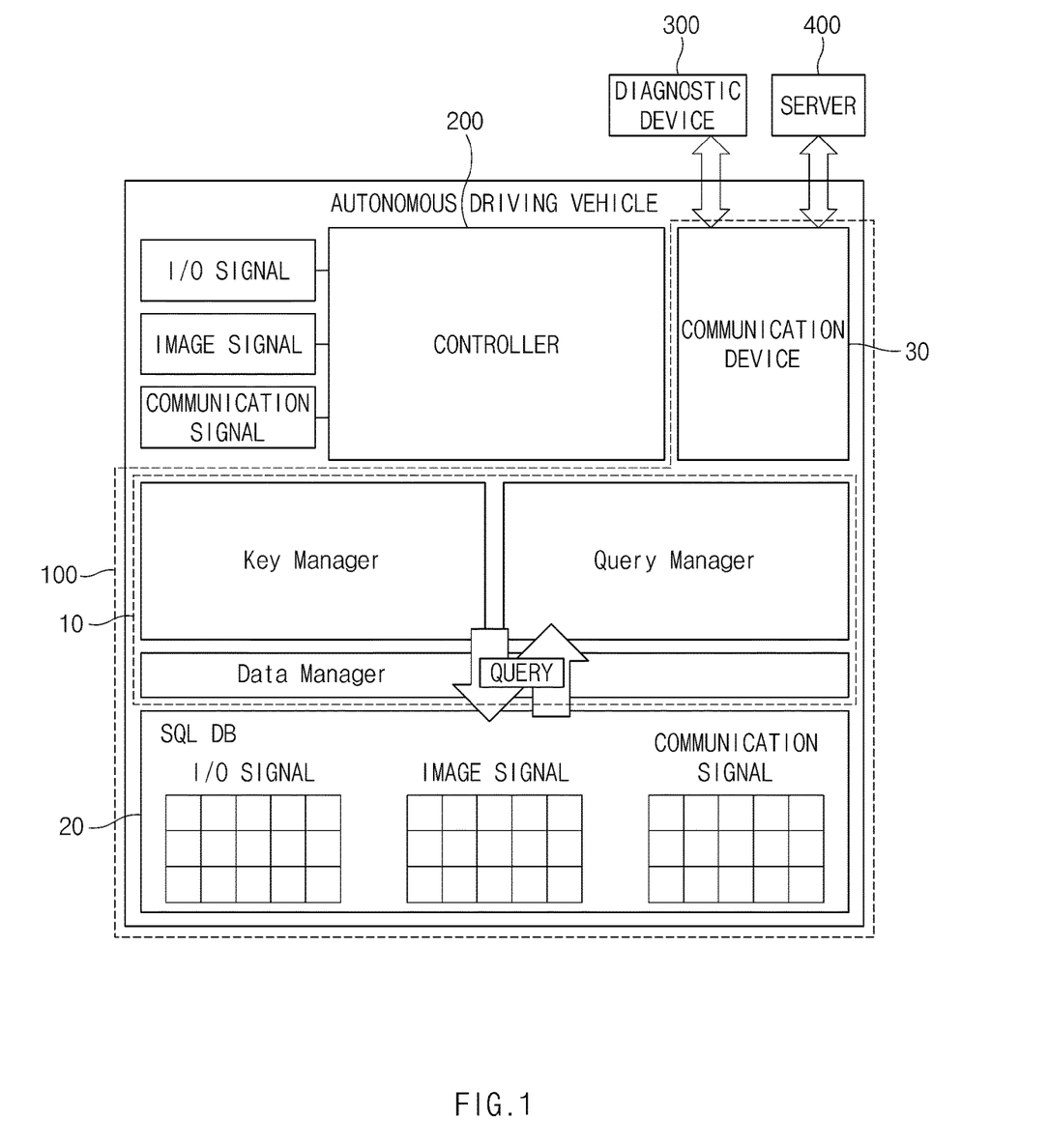
FIG. 1 is a diagram illustrating the configuration of an autonomous vehicle.

FIG. 1 is a diagram illustrating the configuration of an autonomous vehicle.

As shown in FIG. 1, an autonomous driving vehicle may include an autonomous driving data management device 100 and an autonomous driving controller 200.

The autonomous driving controller 200 may generate a query string of instructing recording of an input/output (I/O) signal, an image signal, a communication signal, or the like as autonomous driving data, and transmit the query string to the autonomous driving data management device 100.

The autonomous driving controller 200 may transmit a key stored (e.g., stored in advance) to the autonomous driving data management device 100.

The autonomous driving data management device 100 may receive a key and a query string from the autonomous driving controller 200, supplement the query string, determine an authority level corresponding to the key, modify the query string based on the authority level, and execute the modified query string, thereby recording the autonomous driving data of the vehicle in a database (e.g., an SQL DB 20), and enabling a free search for the autonomous driving data.

The autonomous driving data management device 100 may include a controller 10, the SQL DB 20, and a communication device 30. According to a scheme of implementing the autonomous driving data management device 100, components may be combined with each other to be implemented as one, or some components may be omitted or implemented in a separate device.

The controller 10 may perform overall control to allow each of the components to perform its function normally. The controller 10 may be implemented in the form of hardware or software, or may be implemented in a combination of hardware and software. The controller 10 may be implemented as a microprocessor, but aspects are not limited thereto.

The controller 10 may receive a key and a query string from the autonomous driving controller 200, supplement the query string, determine the authority level corresponding to the key, modify the query string based on the authority level, and execute the modified query string.

The SQL DB 20 may store an I/O signal, an image signal, and a communication signal as autonomous driving data.

The SQL DB 20 may include at least one type of a storage medium of memories of a flash memory type, a hard disk type, a micro type, a card type (e.g., a secure digital (SD) card or an extreme digital (XD) card), and the like, a random access memory (RAM), a static RAM, a read-only memory (ROM), a programmable ROM (PROM), an electrically erasable PROM (EEPROM), a magnetic memory (MRAM), a magnetic disk, and an optical disk type memory.

The communication device 30 may provide a first communication interface (e.g., a wireless communication interface) with a server 400 and/or a second communication interface (e.g., a wired communication interface) with a diagnostic device 300. The communication device 30 may include at least one of a mobile communication module, a wireless Internet module, and a short-range communication module.

The mobile communication module may communicate with the server 400 through a mobile communication network constructed according to a technical standard for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), 5G New Radio, and the like).

The wireless Internet module, which is a module for wireless Internet access, may communicate with the server 400 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), 5G New Radio, and the like.

The short-range communication module may support short-range communication with the server 400 by using at least one of Bluetooth™, radio frequency identification (RFID), infrared data association (IrDA), ultra-wideband (UWB), ZigBee, near field communication (NFC), wireless universal serial bus (USB) technology, and the like.

The controller 10 may include a key manager, a query manager, and a data manager. Depending on a scheme of implementing the controller 10, components may be combined with each other to be implemented as one, or some components may be omitted or implemented in a separate device.

The key manager may determine the authority level of each access subject based on the key input from the autonomous driving controller 200, the diagnostic device 300, or the server 400.

The query manager may supplement the query string input from the autonomous driving controller 200, the diagnostic device 300, or the server 400, and may modify the query string based on the corresponding authority level.

The data manager executes the query string modified by the query manager to record the autonomous driving data in the SQL DB 20. The data manager may encrypt or decrypt the autonomous driving data, and may compress the encrypted autonomous driving data or decompress the compressed autonomous driving data.

The detailed configuration of the controller 10 will be described in detail with reference to FIGS. 2 and 3.

Figure 2:
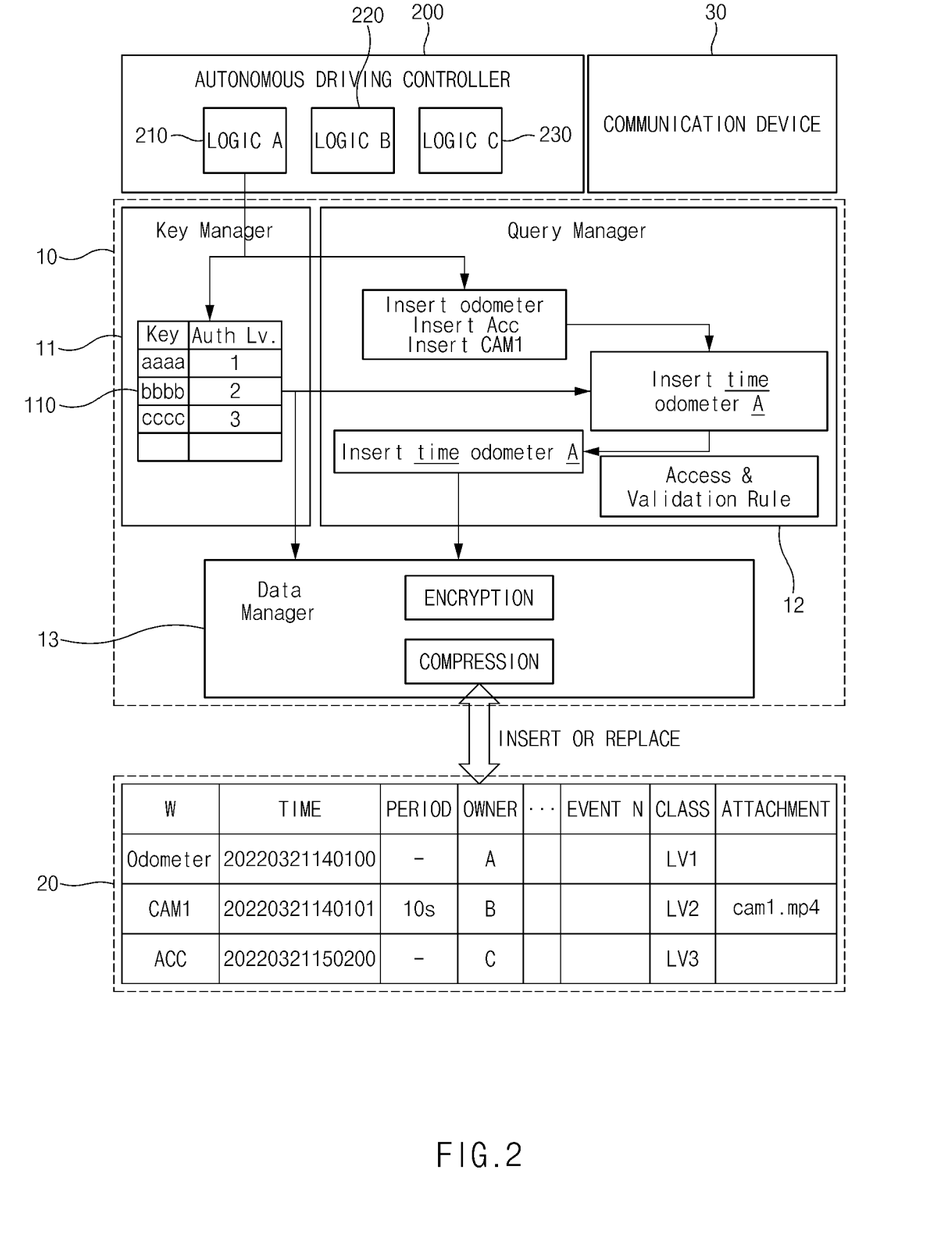
FIG. 2 is a diagram illustrating a process in which a controller of an autonomous driving data management device records autonomous driving data.

FIG. 2 is a diagram illustrating a process in which a controller of an autonomous driving data management device records autonomous driving data.

As shown in FIG. 2, the autonomous driving controller 200 may include a plurality of logics (or programs) related to autonomous driving, where each logic may store a preset key in a security area. For example, logic A 210 may have a key corresponding to a first authority level, logic B 220 may have a key corresponding to a second authority level, and logic C 230 may have a key corresponding to a third authority level. In this case, the level of authority may be based on a condition that satisfies 'first authority level<second authority level<third authority level'.

The logic A 210 of the autonomous driving controller 200 may transmit a key stored therein and a query string of instructing the recording of autonomous driving data to the controller 10 of the autonomous driving data management device 100.

A key manager 11 of the controller 10 may verify the key received from the logic A 210 of the autonomous driving controller 200, and determine the authority level corresponding to the key. In this example, it is assumed that the logic A 210 has the first authority level.

The key manager 11 may include a table 110 in which an authority level corresponding to each key is recorded. For example, the table 110 may include the first authority level corresponding to the first key (aaaa), the second authority level corresponding to the second key (bbbb), and the third authority level corresponding to the third key (cccc).

The key manager 11 of the controller 10 may transmit the determined authority level of the logic A 210 to a query manager 12 and a data manager 13.

The query manager 12 of the controller 10 may parse the query string received from the logic A 210 of the autonomous driving controller 200 to check whether it satisfies a writing rule, and add a tag to the query string.

For example, when 'Insert odometer', 'Insert Acc', and 'Insert CAM1' are included in the query string, the query manager 12 of the controller 10 may supplement the query string such as 'Insert time odometer A', 'Insert time Acc B', and 'Insert CAM1'.

The query manager 12 of the controller 10 may delete contents of which authority level exceeds the authority level of the logic A 210 of the autonomous driving controller 200 from the supplemented query string.

For example, when 'Insert time Acc B' and 'Insert CAM1' are out of the first authority level, the query manager 12 of the controller 10 may determine 'Insert time odometer A' as the final query string.

The data manager 13 of the controller 10 may execute the final query string and store the autonomous driving data in the form of a file in the SQL DB 20.

The query manager 12 of the controller 10 supplement the query string such as 'Insert time odometer A', 'Insert CAM1 B', and 'Insert time Acc C'. For example, the file may include 'Odometer' as the signal name, '20220321140100' as the time, the logic A 210 as the owner information, and LV1 as the class. The file may include 'CAM' as the signal name, '20220321140101' as the time, duration 10 s, the logic B 220 as the owner information, LV2 as the class, and 'cam1.mp4' as the attachment. The file may include 'ACC' as the signal name, '20220321150200' as the time, the logic C 230 as the owner information, and LV3 as the class.

The data manager 13 of the controller 10 may further perform a function of encrypting a file and a function of compressing the encrypted file. The data manager 13 of the controller 10 may perform encryption and decryption based on the authority level determined by the key manager 11. As to the compression scheme, any of the well-known and common techniques may be used.

The logic A 210 of the autonomous driving controller 200 may generate a query string such as INSERT OR REPLACE 'name'='odometer', 'value'='10000 km', 'accident_event'='normal'. In this case, 'accident_event'='normal' may be recorded in the tag and used for search.

The logic A 210 of the autonomous driving controller 200 may generate a query string such as INSERT OR REPLACE 'name'='odometer', 'value'='10000 km', 'accident_event'='normal', 'diagnosis_event'='fr_cam_error'. In this case, when 'diagnosis_event'='fr_cam_error' is content that is outside the first authority level (e.g., content that cannot be requested at the first authority level), the query manager 12 of the controller 10 may delete 'diagnosis_event'='fr_cam_error', and may determine INSERT OR REPLACE 'name'='odometer', 'value'='10000 km', 'accident_event'='normal' as the final query string.

The logic B 220 of the autonomous driving controller 200 may generate a query string such as INSERT OR REPLACE 'name'='brake_act', 'value'='on', 'accident_event'='normal'. If the authority levels associated with all contents of the query string do not exceed the second authority level, the query manager 12 of the controller 10 may not modify the query string.

The logic B 220 of the autonomous driving controller 200 may generate a query string such as INSERT OR REPLACE 'name'='fr_cam', 'duration'='10 sec', 'value'='attached', 'attachment'='fr_cam01.mp4'. If the authority levels associated with all contents of the query string do not exceed the second authority level, the query manager 12 of the controller 10 may not modify the query string.

Figure 3:
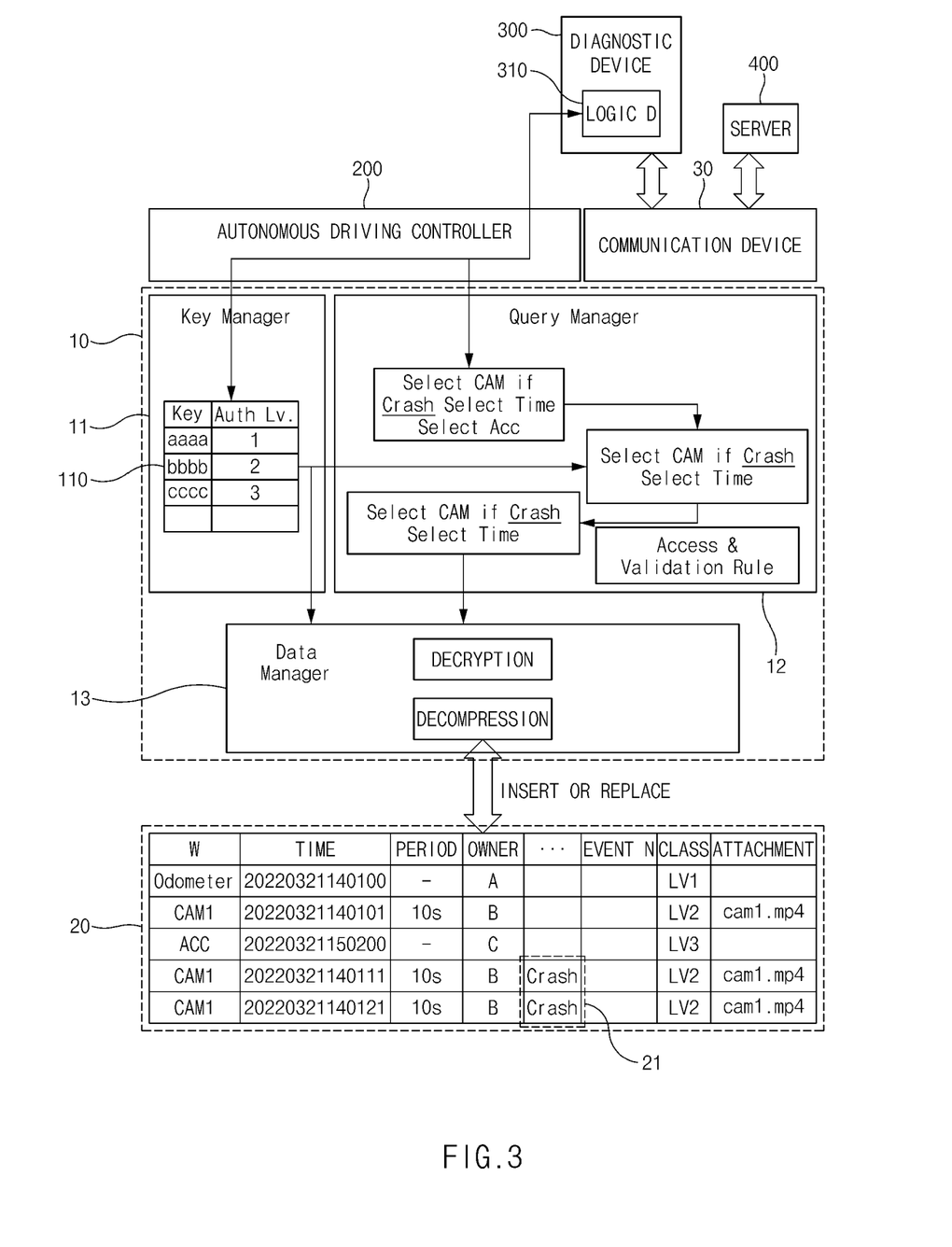
FIG. 3 is a diagram illustrating a process in which a controller of an autonomous driving data management device searches for autonomous driving data.

FIG. 3 is a diagram illustrating a process in which a controller of an autonomous driving data management device searches for autonomous driving data. The diagnostic device 300 among the diagnostic device 300 and the remote server 400 will be described as an example of an external connection device.

As shown in FIG. 3, the diagnostic device 300 may include logic D 310 that may store a preset key in a secure area. For example, the logic D 310 may have a key corresponding to the second authority level.

The logic D 310 of the diagnostic device 300 may transmit a key stored therein and a query string instructing a search for autonomous driving data to the controller 10 of the autonomous driving data management device 100.

The key manager 11 of the controller 10 may verify the key received from the logic D 310 of the diagnostic device 300, and determine the authority level corresponding to the key. The key manager 11 may include the table 110 in which an authority level corresponding to each key is recorded. For example, the table 110 may include the first authority level corresponding to the first key (aaaa), the second authority level corresponding to the second key (bbbb), and the third authority level corresponding to the third key (cccc).

The key manager 11 of the controller 10 may transmit the determined authority level of the logic D 310 to the query manager 12 and the data manager 13.

The query manager 12 of the controller 10 may parse the query string received from the logic D 310 of the diagnostic device 300 to check whether it satisfies a writing rule.

The query manager 12 of the controller 10 may delete content of which the authority level exceeds the authority level of the logic D 310 of the diagnostic device 300 from the query string.

For example, when 'Select CAM if Crash', 'Select Time', and 'Select ACC' are included in the query string, and 'Select ACC' is the content out of the authority level of the logic D 310, the query manager 12 of the controller 10 may delete 'Select ACC' from the query string and determine 'Select CAM if Crash' and 'Select Time' as the final query string.

The data manager 13 of the controller 10 may execute the final query string to search the autonomous driving data in the SQL DB 20.

For example, it may be possible to search for 'CAM' including 'Crash (21)' as a tag among the files stored in the SQL DB 20. The CAM data found in such a manner may be provided to the logic D 310 of the diagnostic device 300.

The logic D 310 of the diagnostic device 300 may generate a query string such as SELECT 'odometer', 'brake_act' FROM ADAS_SIG WHERE date>yesterday. In this case, if the 'brake_act' is out of the authority level of the logic D 310 of the diagnostic device 300, the query manager 12 of the controller 10 may delete 'brake_act' from the query string. In this case, the query string may represent a command to retrieve the value of 'odometer' recorded from yesterday to the present.

As described above, although the autonomous driving data management device 100 provided separately from the autonomous driving controller 200 has been described as an example, it is possible to implement the autonomous driving controller 200 to perform the function of the controller 10 of the autonomous driving data management device 100.

Figure 4:
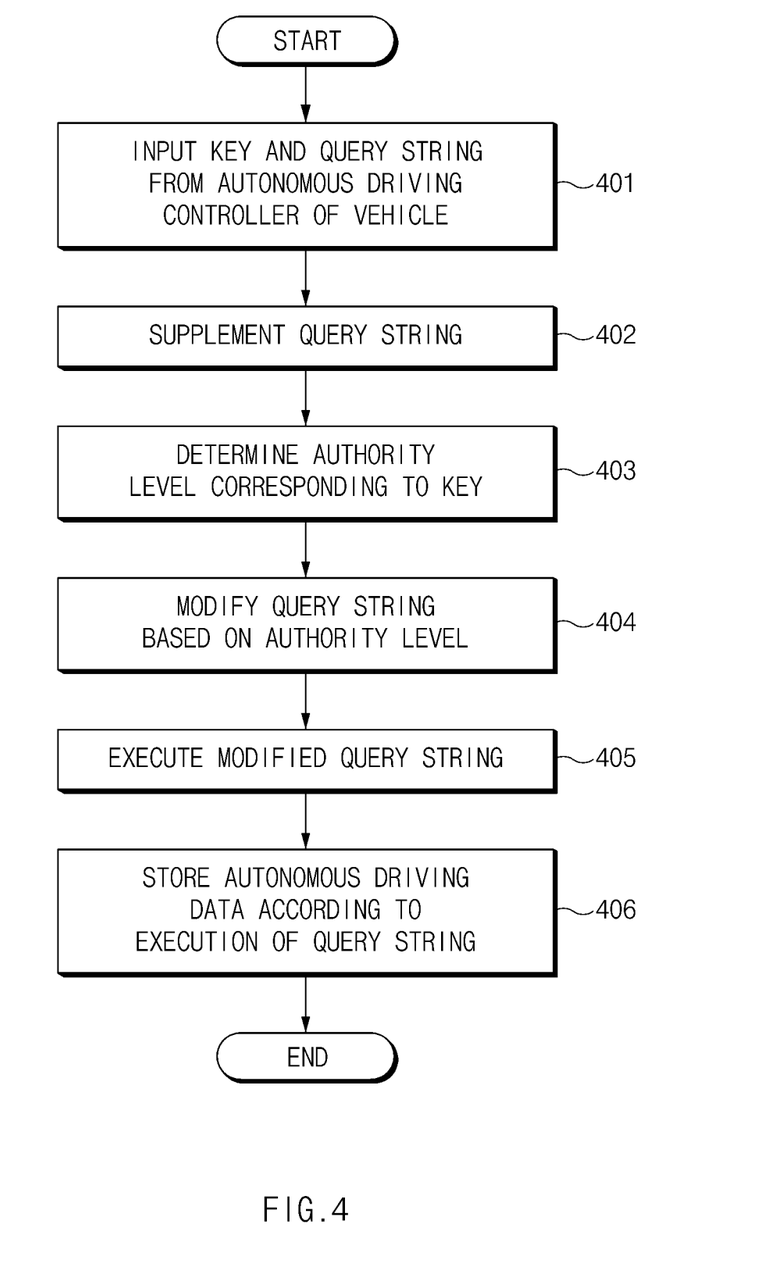
FIG. 4 is a flowchart illustrating a process of recording autonomous driving data in a SQL DB in an autonomous driving data management method.

FIG. 4 is a flowchart illustrating a process of recording autonomous driving data in a SQL DB in an autonomous driving data management method.

The controller 10 may receive a key and a query string from the autonomous driving controller of a vehicle (e.g., in step 401).

The controller 10 may supplement the query string (e.g., in step 402).

The controller 10 may determine an authority level corresponding to the key (e.g., in step 403).

The controller 10 may modify the query string based on the authority level (e.g., in step 404).

The controller 10 may execute the modified query string (e.g., in step 405).

The SQL DB 20 may store the autonomous driving data according to the execution of the query string (e.g., in step 406).

Figure 5:
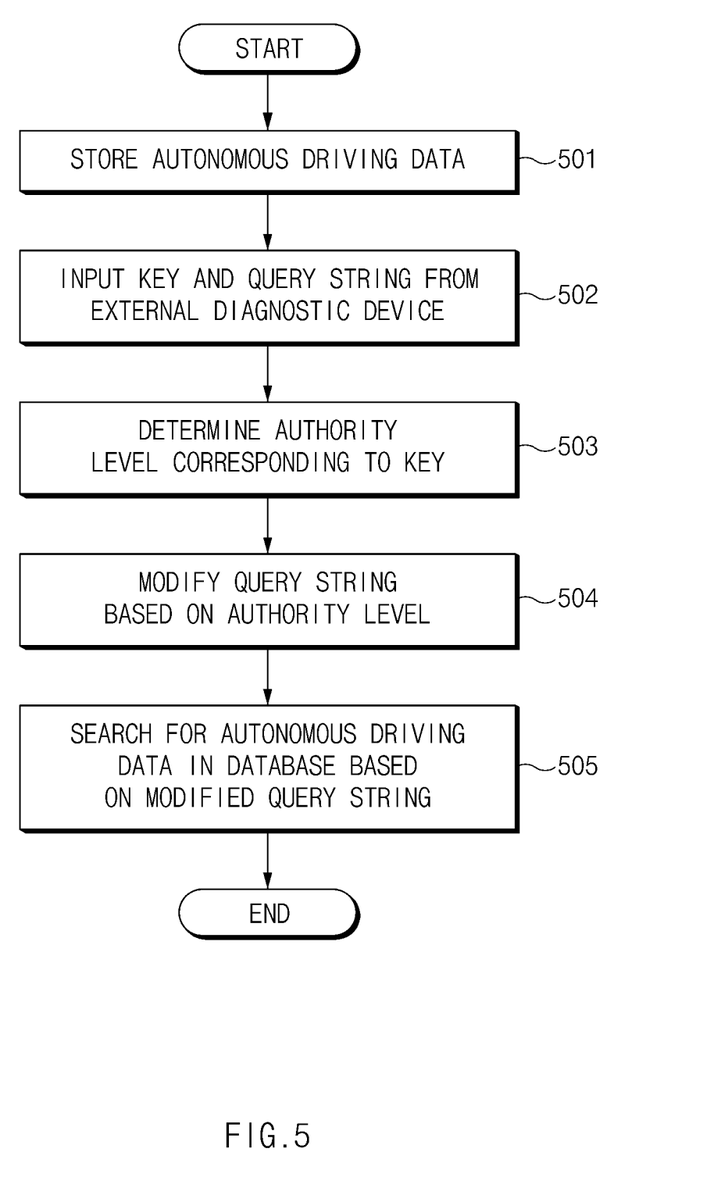
FIG. 5 is a flowchart illustrating a process of searching for autonomous driving data in an SQL DB in an autonomous driving data management method.

FIG. 5 is a flowchart illustrating a process of searching for autonomous driving data in an SQL DB in an autonomous driving data management method.

The SQL DB 20 may store autonomous driving data (e.g., in step 501).

The controller 10 may receive a key and a query string from the external diagnostic device 300 (e.g., in step 502).

The controller 10 may determine the authority level corresponding to the key (e.g., in step 503).

The controller 10 may modify the query string based on the authority level (e.g., in step 504).

The controller 10 may search for autonomous driving data in the SQL DB 20 based on the modified query string (e.g., in step 505).

An aspect of the present disclosure provides a device for managing autonomous driving data and method thereof capable of receiving a key and a query string from an autonomous driving controller of a vehicle, supplementing the query string and determining a authority level corresponding to the key, modifying the query string based on the authority level, executing the modified query string, thereby recording the autonomous driving data of the vehicle in a structured query language (SQL) data base (DB).

Another aspect of the present disclosure provides a device for managing autonomous driving data and method thereof capable of receiving a key and a query string from an external diagnostic device, determining an authority level corresponding to the key, modifying the query string based on the authority level, and retrieving autonomous driving data from the database based on the modified query string, thereby enabling a free search for autonomous driving data.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for managing autonomous driving data includes a controller that receives a key and a query string from an autonomous driving controller of a vehicle, supplements the query string, determine an authority level corresponding to the key, modifies the query string based on the authority level, and executes the modified query string, and a database that stores the autonomous driving data according to an execution of the query string.

The autonomous driving controller may include a plurality of logics, and may store a key for each logic.

The controller may add owner information and time to the query string received from logic of the autonomous driving controller.

The controller may include a table in which the authority level corresponding to each key is recorded, and may determine the authority level of the logic of the autonomous driving controller based on the table.

The controller may delete, from the query string input from the logic of the autonomous driving controller, content of which the authority level exceeds the authority level of the logic of the autonomous driving controller.

The controller may determine an authority level corresponding to a key when receiving the key and a query string from an external diagnostic device, modify the query string based on the authority level, and search for autonomous driving data in the database based on the modified query string.

The controller may determine the authority level of the external diagnostic device based on a table in which the authority level corresponding to each key is recorded.

The controller may delete content of which the authority level exceeds the authority level of the external diagnostic device from the query string.

The controller may search for the autonomous driving data in the database based on tag information included in the query string.

According to another aspect of the present disclosure, a method of managing autonomous driving data includes receiving, by a controller, a key and a query string from an autonomous driving controller of a vehicle, supplementing, by the controller, the query string, determining, by the controller, an authority level corresponding to the key, modifying, by the controller, the query string based on the authority level, executing, by the controller, the modified query string, and storing, by a database, the autonomous driving data according to the executing of the query string.

The receiving of the key and the query string may include including, the autonomous driving controller, a plurality of logics, storing, by each logic of the autonomous driving controller, a key thereof, and receiving the key and the query string from the logic of the autonomous driving controller.

The supplementing of the query string may include adding, by the controller, owner information and time to the query string.

The determining of the authority level may include including, by the controller, a table in which the authority level corresponding to each key is recorded, and determining, by the controller, the authority level of the logic of the autonomous driving controller based on the table.

The modifying of the query string may include deleting, by the controller, content of which the authority level exceeds the authority level of the logic of the autonomous driving controller from the query string.

According to still another aspect of the present disclosure, a method of managing autonomous driving data includes storing, by a database, the autonomous driving data, receiving, by a controller, a key and a query string from an external diagnostic device, determining, by the controller, an authority level corresponding to the key, modifying, by the controller, the query string based on the authority level, and searching, by the controller, for autonomous driving data in the database based on the modified query string.

The determining of the authority level may include including, by the controller, a table in which the authority level corresponding to each key is recorded, and determining, by the controller, the authority level of the external diagnostic device based on the table.

The modifying of the query string may include deleting, by the controller, content of which the authority level exceeds the authority level of the external diagnostic device from the query string.

The searching for the autonomous driving data in the database may include searching, by the controller, for the autonomous driving data in the database based on tag information included in the query string.

Figure 6:
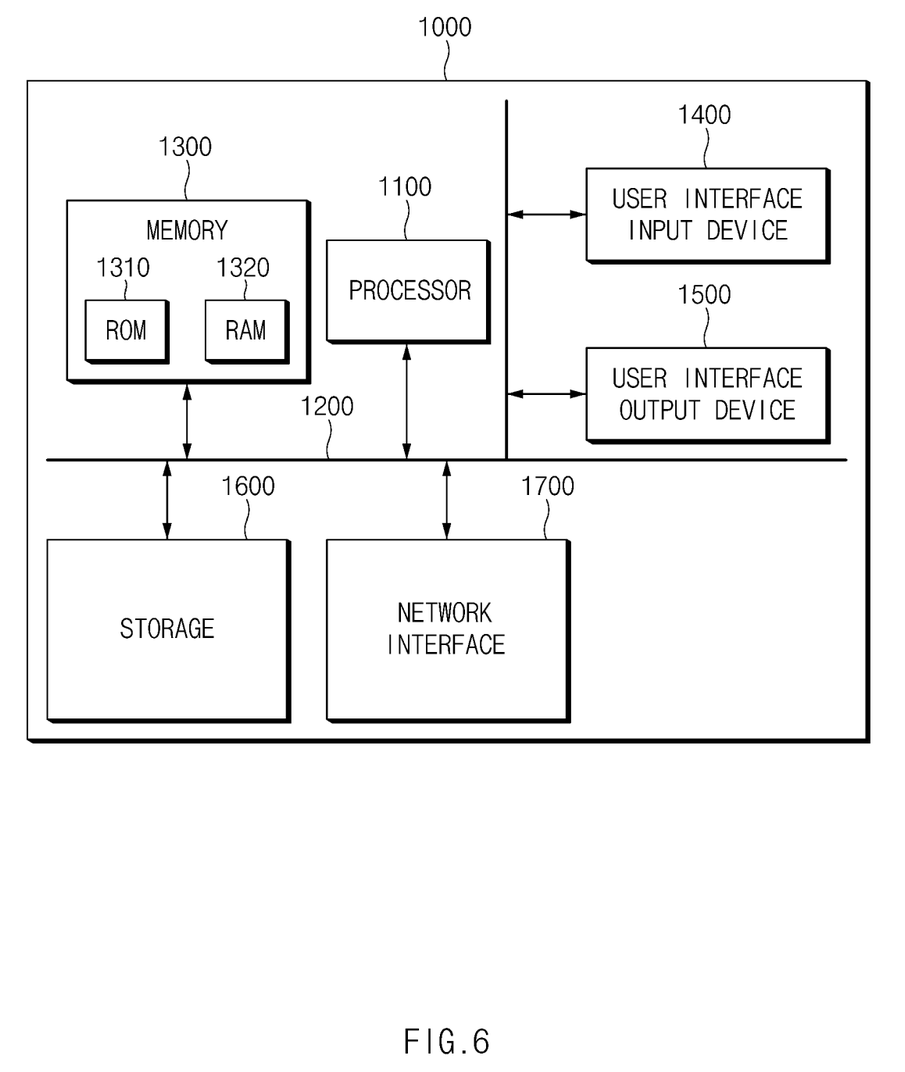
FIG. 6 is a block diagram illustrating a computing system for executing an autonomous driving data management method.

FIG. 6 is a block diagram illustrating a computing system for executing an autonomous driving data management method.

Referring to FIG. 6, an autonomous driving data management method described herein may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the features of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

As described above, the device for managing autonomous driving data and method thereof according to the present disclosure may record the autonomous driving data of the vehicle in a structured query language (SQL) data base (DB) and enable a free search for autonomous driving data by receiving a key and a query string from an autonomous driving controller of a vehicle, supplementing the query string and determining an authority level corresponding to the key, modifying the query string based on the authority level, and executing the modified query string.

Although various examples of the present disclosure have been described for illustrative purposes, those skilled in the art will appreciate that various modifications, additions and substitutions are possible, without departing from the scope and spirit of the disclosure.

Therefore, the examples described in the present disclosure are provided for the sake of descriptions, not limiting the technical concepts of the present disclosure, and it should be understood that exemplary embodiment(s) is/are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A device comprising:
a controller configured to:
receive, from an autonomous driving controller of a vehicle, a key and a query string;
determine an authority level corresponding to the key;
modify the query string based on the authority level; and
execute the modified query string; and
a database configured to store autonomous driving data according to an execution of the modified query string.

2. The device of claim 1, wherein the autonomous driving controller comprises a plurality of logics, and is configured to store the key, and
wherein the key comprises:
a first key for a first logic of the plurality of logics; and
a second key for a second logic of the plurality of logics.

3. The device of claim 1, wherein the controller is configured to add information indicating an owner and time to a query string received from logic of the autonomous driving controller.

4. The device of claim 1, wherein the controller is configured to determine the authority level corresponding to the key based on a table in which a plurality of authority levels each corresponding to a different key is recorded.

5. The device of claim 1, wherein the controller is configured to modify the query string by deleting, from the query string received from the autonomous driving controller, content unauthorized for the authority level corresponding to the key.

6. The device of claim 1, wherein the controller is configured to:
receive, from a diagnostic device, a second key and a second query string;
determine a second authority level corresponding to the second key;
modify, based on the second authority level, the second query string; and
based on the modified second query string, search for the autonomous driving data stored in the database.

7. The device of claim 6, wherein the controller is configured to determine the second authority level based on a table in which a plurality of authority levels each corresponding to a different key is recorded.

8. The device of claim 6, wherein the controller is configured to modify the second query string by deleting, from the second query string received from the diagnostic device, content unauthorized for the second authority level.

9. The device of claim 6, wherein the controller is configured to search for the autonomous driving data stored in the database based on tag information included in the modified second query string.

10. The device of claim 1, further comprising:
a communication interface;
the autonomous driving controller, wherein the autonomous driving controller is configured to:
detect surrounding environment of the vehicle;
control, based on the detected surrounding environment and based on a configured autonomous driving level of a plurality of autonomous driving levels, autonomous driving of the vehicle;
generate, based on the configured autonomous driving level, the key and the query string, wherein the key is a digital key corresponding to the configured autonomous driving level, and wherein the query string is a query string corresponding to the configured autonomous driving level; and
transmit, to the controller via the communication interface, the key and the query string;
wherein the controller is configured to:
identify the authority level corresponding to the key, wherein the authority level is set based on the configured autonomous driving level; and
modify the query string by automatically modifying, based on at least one configuration parameter of the authority level, the query string to a modified query string; and wherein the database is configured to control the autonomous driving data, of the vehicle, according to the execution of the modified query string.

11. The device of claim 10, wherein the controller is configured to:
   verify the digital key;
   determine, based on the verified digital key, that an accessing logic of the autonomous driving controller corresponds to the configured autonomous driving level;
   identify the authority level that corresponds to the verified digital key; and
   automatically modify the query string to the modified query string by associating an indication of an identity of the accessing logic of the autonomous driving controller.

12. A method comprising:
   receiving, by a controller from an autonomous driving controller of a vehicle, a key and a query string;
   determining, by the controller, an authority level corresponding to the key;
   modifying, by the controller, the query string based on the authority level;
   executing, by the controller, the modified query string; and
   storing, in a database, autonomous driving data according to the executing of the modified query string.

13. The method of claim 12, further comprising:
   storing, in the autonomous driving controller, a plurality of logics; and
   storing, for a first logic of the plurality of logics, the key, wherein the key received from the autonomous driving controller corresponds to the first logic,
   wherein the receiving the key and the query string comprises receiving the key and the query string from the first logic of the plurality of logics.

14. The method of claim 13, further comprising:
   adding, by the controller, information indicating an owner and time to the received query string.

15. The method of claim 13, further comprising:
   determining, by the controller, a table in which a plurality of authority levels each corresponding to a different key is recorded,
   wherein the determining the authority level corresponding to the key comprises determining, by the controller, the authority level corresponding to the key based on the table.

16. The method of claim 15, wherein the modifying the query string comprises:
   deleting, by the controller, content unauthorized for the authority level corresponding to the key from the received query string.

17. A method comprising:
   storing, in a database, autonomous driving data;
   receiving, by a controller from a diagnostic device, a key and a query string;
   determining, by the controller, an authority level corresponding to the key;
   modifying, by the controller and based on the authority level, the query string; and
   searching, by the controller and based on the modified query string, for the autonomous driving data stored in the database.

18. The method of claim 17, further comprising:
   determining, by the controller, a table in which a plurality of authority levels each corresponding to a different key is recorded,
   wherein the determining the authority level corresponding to the key comprises determining, by the controller, the authority level corresponding to the key based on the table.

19. The method of claim 17, wherein the modifying the query string comprises:
   deleting, by the controller, content unauthorized for the authority level corresponding to the key from the received query string.

20. The method of claim 17, wherein the searching for the autonomous driving data stored in the database comprises:
   searching, by the controller, for the autonomous driving data stored in the database based on tag information associated with the received query string.

* * * * *